United States Patent [19]

Anderson et al.

[11] Patent Number: 4,935,255

[45] Date of Patent: Jun. 19, 1990

[54] CONTROLLED HEADSPACE GAS PACKAGING OF ASEPTIC DAIRY PRODUCTS WHILE MAINTAINING FAT EMULSION STABILITY

[75] Inventors: Delmar L. Anderson, Baldwinsville; David J. Keller, Syracuse; Paul J. Streiff, Camillus, all of N.Y.

[73] Assignee: Borden, Inc., Columbus, Ohio

[21] Appl. No.: 124,395

[22] Filed: Nov. 18, 1987

Related U.S. Application Data

[63] Continuation of Ser. No. 807,450, Dec. 10, 1985, abandoned.

[51] Int. Cl.⁵ .......................... A23C 3/03; A23C 3/00; A23L 3/3418
[52] U.S. Cl. ................................ 426/316; 426/317; 426/399; 426/474; 426/130; 426/522
[58] Field of Search ............... 426/474, 399–401, 426/316, 324, 317, 330.2, 522, 410, 412, 130; 53/432, 434, 433

[56] References Cited

U.S. PATENT DOCUMENTS

| | | | |
|---|---|---|---|
| 669,702 | 3/1901 | Nash | 426/401 |
| 1,007,046 | 10/1911 | Aguayo | 426/317 |
| 1,589,192 | 6/1926 | Manchester | 426/474 |
| 1,714,597 | 5/1929 | Grindrod | 426/474 |
| 2,195,469 | 4/1940 | Richter | 426/317 |
| 2,207,817 | 7/1940 | Parker et al. | 426/317 |
| 2,772,979 | 12/1956 | Graves | 426/399 |
| 2,775,079 | 12/1956 | Sarofeen . | |
| 2,788,283 | 4/1957 | Stewart et al. | 426/399 |
| 2,889,673 | 6/1959 | Rockland et al. . | |
| 2,899,320 | 8/1959 | Davies et al. | 426/474 |
| 3,063,211 | 11/1962 | Graves . | |
| 3,063,845 | 11/1962 | Graves | 426/399 |
| 3,084,052 | 4/1963 | McLaughlin . | |
| 3,105,763 | 10/1963 | North et al. | 426/400 |
| 3,230,095 | 1/1966 | Stewart | 426/476 |
| 3,340,072 | 9/1967 | Stewart | 426/399 |
| 3,623,894 | 11/1971 | Samuelsson | 426/330.2 |
| 3,725,086 | 4/1973 | Horner . | |
| 3,764,000 | 10/1973 | Jentsch . | |
| 3,789,888 | 2/1974 | James et al. . | |
| 3,942,301 | 3/1976 | Domke . | |
| 4,016,705 | 4/1977 | Wilson et al. . | |
| 4,175,140 | 11/1979 | Bachmann et al. | 426/399 |
| 4,221,820 | 9/1980 | Jentsen | 426/399 |
| 4,259,360 | 3/1981 | Venetucci et al. | 426/231 |
| 4,347,695 | 9/1982 | Zobel et al. | 426/397 |
| 4,409,252 | 10/1983 | Buschkens et al. . | |
| 4,747,253 | 5/1988 | Schulte | 53/433 |

FOREIGN PATENT DOCUMENTS

| | | | |
|---|---|---|---|
| 1261 | 10/1936 | Australia | 426/474 |
| 500464 | 3/1954 | Canada | 426/317 |
| 0104696 | 4/1984 | European Pat. Off. . | |
| 0117002 | 8/1984 | European Pat. Off. | 426/324 |
| 332641 | 7/1930 | United Kingdom | 426/317 |
| 1196852 | 7/1970 | United Kingdom . | |
| 1222239 | 2/1971 | United Kingdom | 426/399 |
| 1455652 | 11/1976 | United Kingdom | 426/397 |
| 2089191 | 6/1982 | United Kingdom | 426/397 |

*Primary Examiner*—Steven Weinstein
*Attorney, Agent, or Firm*—Venable, Baetjer, Howard & Civiletti

[57] ABSTRACT

A process is disclosed for the aseptic packaging of fluid dairy products having improved stability and flavor. A selected gas is injected into the sterile milk or other fluid dairy product. The resulting milk-gas mixture is then filled into a container under aseptic conditions. The fill volume of the mixture is such as to leave no free space in the container when it is closed. However, on standing the gas and the milk separate, to form a gas-filled headspace. The injection gas is preferably nitrogen. For taste improvement, the gas may be selected so that the oxygen content of the fluid dairy product, when the container is closed, is up to 4 ppm to 5 ppm. The headspace is preferably from about 2% to about 6% of the total volume of the container.

10 Claims, No Drawings

CONTROLLED HEADSPACE GAS PACKAGING OF ASEPTIC DAIRY PRODUCTS WHILE MAINTAINING FAT EMULSION STABILITY

This application is a continuation of application Ser. No. 807,450, filed Dec. 10, 1985, now abandoned.

BACKGROUND OF THE INVENTION

1. Field of the Invention

The present invention relates to an improvement in the aseptic packaging of fluid dairy products, and to the packaged products themselves. Fluid dairy products packaged in accordance with the invention are characterized by improved stability and improved flavor, generally.

2. Background

Fluid dairy products such as milk, cream, chocolate milk, and other such dairy products, can be preserved for short periods of time by refrigeration. At room termperature and even under refrigeration, these products deteriorate due to microbiological activity. This activity causes physical changes and leads to unacceptable flavor characteristics. Pasteurzation slows down and retards this activity but does not prevent it, it just postpones it.

Within the past 30 years, aseptic packaging systems have been developed to provide commercially feasible packaging of sterile dairy products intended for long term storage without refrigeration. These systems make use of ultra-high temperature (UHT) processing. UHT processing produces a product that is free of spoilage organisms by heating the fluid dairy product to a temperature that is high enough to kill spore-forming organisms, for a sufficiently short period of time so as to minimize the physical and chemical changes in the product itself. Common process parameters for UHT processing are a temperature in the range of 140° C. to 150° C. for a time 2 to 7 seconds. By utilizing the UHT processing in conjunction with an aseptic filling system, packaged fluid dairy products can be produced that remain fresh at ambient temperature for extended periods. The techniques and equipment that are required for UHT processing and for aseptic filling are well known in the art.

Two different types of UHT processing are in common usage. These are commonly referred to in the industry as the direct process and the indirect process.

In the direct sterilization process, steam is injected directly into the milk or other fluid dairy product to heat it rapidly with maximum efficieny of heat exchange. For a description of one direct sterilization process and the equipment used, see U.S. Pat. No. 3,230,095, the disclosure of which is incorporated herein by reference. Since the injected steam condenses directly in the milk, the condensation of the steam dilutes the milk with from 10% to 12% by weight of added water. This water must be removed prior to sale. Removal of the is generally accomplished by vacuum evaporation.

In the indirect sterilizaiton process, the milk or other liquid dairy product is passed through a heat exchanger, generally a heat exchanger of the tubular or plate types. During this heat exchange process, milk is generally passed through a tubular coil that is maintained in a very hot environment, often through the use of superheated steam. Because the heat exchange takes place through the wall of the tube, the heat exchange is less efficient than in the direct process, and the high temperature enviroment about the tube generally is at a very high temperature. This tends to produce a "cooked" flavor in the milk, as is well known among those in the industry.

To a lesser degree, the direct process also causes an undesirable flavor change. It is theorized that the undesirable flavor change is caused by the formation of free sulfhydryl materials in the milk during the UHT treatment. In addition, UHT-processed milk tends to exhibit some instability on standing. It is theorized that this instability, which manifests itself as fat separation among other things, is most likely caused by a change in the physical relationship between the fat, casein, and denatured serum proteins in the milk because of the UHT processing.

SUMMARY OF THE INVENTION

This invention is applicable generally to the aseptic packaging of fluid dairy products. Such products include whole milk, skim milk, lowfat milk, cream of all types, flavored lowfat milks such as, for example, strawberry milk and chocolate milk, and the like. For convenience in describing the invention, such fluid dairy products are hereafter generically referred to as milk. It should be understood, however, that this term is used for covenience of description only and is intended to illustrate the invention in connection with all such fluid dairy products.

The invention is an aseptic packaging process that can lead to improved flavor and improved stability, when the milk or other fluid dairy product is properly processed.

In its broad aspects, a process for the aseptic packaging of a fluid dairy product in accordance with the present invention comprises injecting into sterile milk a quantity of a sterile gas so as to form many small bubbles that are substantially uniformly distributed throughout the milk. The preferred gas in nitrogen but some minor amount of oxygen may be present in the nitrogen. The gas-milk mixture is then promptly sealed in a package under aseptic conditions. The gas and milk separate in the package, providing a headspace containing evolved gas. This process appears to promote good flavor and superior stability, of the packaged milk during storage.

According to one preferred embodiment of the invention, the aseptic packaging process comprises injecting into a flowing, confined stream of sterile milk a stream of a sterile gas that is under a higher pressure than the milk. The gas is selected from the group consisting of an essentially inert gas, such as nitrogen, and a mixture of oxygen with an inert gas, such as nitrogen which has been diluted with a small amount of oxygen, or in some cases, and less preferably, with air. The mode of injection, coupled with turbulent passage of the gas-milk mixture through a pipeline, produce many fine bubbles that are substantially uniformly distributed throughout the gas-milk mixture. This mixture is then promptly filled, under aseptic conditions, into a sterile container. The mixture of milk and gas is promptly sealed in the container, using known techniques and equipment.

In one preferred embodiment of this process, tubular container stock is gripped between jaws that simultaneously crimp, seal, and cut the tubular stock, simultaniously to form the top seal of one container, and the bottom seal of the next container to be filled. Filling is done continuously, and each container is completely filled with the milk-gas mixture. The filled, sealed container is then permitted to stand, and its contents separate into a liquid portion and a gas portion.

The gas portion is primarly dirived from released injected gas but includes some gas that was present in the milk prior to the gas injection. The gas portion collects in a headspace portion of the container that generally amounts to from 2% to 10% and preferably from 5% to 6%, of its total volume.

The gas that is enclosed in the headspace is maintained in contact with the sterile packaged milk. This contact appears to be responsible for flavor maintenance or improvement, and for stability, on storage.

The preferred composition for the injection gas is nitrogen, which is readily available, and inexpensive. It produces good results. However there are some indications that the presence of a proper amount of oxygen affects flavor and stability favorably. The presence of some oxygen appears to offer some benefit in combatting "cooked" flavor resulting from UHT treatment. Too high an oxygen content may lead to chemical instability, manifested by off-flavors. The present invention provides a way to achieve optimum oxygen levels to balance these seemingly conflicting needs.

The chemical composition of the gas that is injected into the sterile milk can be selected so as to optimize the oxygen content of the aseptically packaged product. For example, if the oxygen content of the sterile milk is below about 5 ppm, as would usually be the case with a direct process sterile milk, then the injected gas may contain sufficient oxygen to raise the oxygen concentration somewhat. When the oxygen content of the sterile milk or other liquid dairy product is above about 5 ppm, as would be the case with an indirect process material, then the chemical composition of the gas can be selected to reduce the oxygen content of the milk. Thus, for direct-processed sterile milk, a preferred chemical composition for the injected gas could be pure nitrogen, or nitrogen containing 5% or less by volume of oxygen, such as, for example, 2.5% oxygen or 5% oxygen by volume. For an indirect-process sterile milk, a suitable injection gas may be essentially pure nitrogen.

Generally, the provision of a headspace filled primarily with nitrogen appears to be preferred. An oxygen-containing injection gas can be used however, or it can be reserved for dealing with off flavors or other special situations.

DETAILED DESCRIPTION OF THE INVENTION

In practicing the process of the invention, the milk is subjected to an ultra-high temperature (UHT) treatment to sterilize it, injected with sterile gas to form a liquid-gas mixture, and then it is packaged under aseptic conditions in a sutiable container. Upon standing in its aseptic packaging, the gas-liquid mixture separates as the gas evolves from the milk.

The UHT treatment of the milk may be either a direct or indirect process. After sterilization, the milk is passed as a confined stream through a pipeline that is fitted with suitable gas injection means. For simplicity, the injection means may simply involve the insertion of a tee in a horizontal reach of the pipeline, in such fashion that one arm of the tee is directed vertically. A nozzle of the pressurized spray type is mounted within the tee. The nozzle in turn is connected to a source of injection gas that is maintained at an elevated pressure, so that the gas can be injected into the liquid, being at a higher pressure than the milk as it flows past the nozzle. Alternatively, a porous, sintered mass may be positioned within the pipe so as to be immersed in the stream of milk, while being connected to the source of elevated pressure gas. The gas then escapes through the porous, sintered mass into the stream of milk, in the form of very fine bubbles. One suitable such device is shown, for example, in U.S. Pat. No. 4,259,360.

The nozzle may be disposed above the level of the flowing stream of milk, or within it. The flow of injection gas, at a pressure higher than the liquid pressure, can be expected to create a sort of shield of gas about the nozzle, in operation. The gas mixes into the flowing milk as it is carried along by the flow. Generally, the injection of the gas and the turbulence within the pipeline form the milk and the injected gas into a mixture of fine gas bubbles and milk, and some of the injected gas dissolves in the milk. The relative volumes of the gas and of the milk are adjusted so that frothing and foaming during filling are avoided.

While the use of a nozzle of the pressurized spray type for gas injection is convenient and is preferred, other gas injection devices and techniques may be used. Whatever gas injection technique is used, it should result in the distribution of small bubbles of the injected gas substantially uniformly throughout the flowing steam of milk, to cause a maximum interface area between the surface of the gas bubbles and the milk. The gas should be injected into the milk at a pressure of about 1.5 to about 2.5 bars, gauge.

Since aseptic conditions must be maintained throughout the entire packaging system if it is to be effective, the gas must be sterile. This is usually accomplished by passing the gas through a suitable heater, preferably just before injecting it into the sterile milk.

The quantity of injection gas that should be used with a given volume of sterile milk should be determined empirically for a given piece of equipment. In making this determination, the mixture of sterile milk and the injected gas is filled into a sterile container that is promptly closed and sealed. As the milk-gas mixture stands in its container, the gas evolves from the milk. As it evolves, it forms and fills a headspace in the container. The headspace will trap the evolved gas. The milk will contain some residual injected gas and, as well, dissolved and/or entrained gas present in the milk prior to the gas injection. Both types of gas evolve into the headspace.

When the injected gas is nitrogen, or nitrogen containing about 5% by volume of oxygen, at the time the container is closed and sealed, the milk should generally contain up to about 4 ppm of oxygen to 5 ppm of oxygen. Less oxygen may be present but the oxygen content of the injection gas and the amount of gas injected should be adjusted so that the amount of oxygen in the freshly packaged milk-gas mixture does not exceed about 5 ppm.

When the milk has been subjected to a direct UHT treatment, it will ordinarily have been subjected to vacuum evaporation as well, to remove condensed steam from the milk, prior to passing through the gas injection site. The vacuum evaporation step not only removes condensed steam, it also removes oxygen from the milk. Typically, the oxygen content of milk that has been subjected to vacuum evaporation is on the order of 1-2 ppm. When sterile milk containing 1-2 ppm of oxygen is processed with essentially pure nitrogen as the injection gas, the cooked flavor that is always present in the UHT-processed milk may persist over a short period of time after packaging. However, upon standing with evolved gas in the headspace, the flavor often improves. This may be due, in part, to the presence of some oxygen in the headspace and in the milk that interacts with undesirable flavor notes to improve flavor. The injection gas may include some oxygen. A nitrogen gas to which up to about 5% oxygen by volume has been added has been found to be suitable for use as the injection gas. Even compressed air has been used, but the results in flavor and stability are not as good as those obtained when nitrogen or primarily nitrogen injection gas is used.

When the sterile milk has been produced by the indirect process, because of the usually higher process temperature employed in the heat exchanger, the flavor change will be more pronouced and the "cooked" flavor will be more detected than is the case with direct-processed milk. The oxygen content of the sterile milk leaving the heat exchanger ordinarily will be about 8 ppm to 99 ppm, perhaps more. It is considered desirable to lower this oxygen content so that the sterile milk, upon closing of the container, has an oxygen content not in excess of 5 ppm. In order to accomplish this, the sterile milk may be subjected to a vacuum treatment that removes dissolved and entrained gas, and thus lowers the oxygen content.

This vacuum treatment is not intended to remove water from the milk, since there has been no steam condensation in the milk. Rather, the vacuum treatment is intended for the purpose of reducing the oxygen content of the milk to be comparable to that of direct process sterile milk, namely, to an oxygen content on the order of less than 5 ppm, or generally about 1-2 ppm. When this is done, the preferred injected gas employed in accordance with the invention is nitrogen, but the gas may contain oxygen to increase the oxygen content of the sterile milk, so that when the package has been filled, and is closed and sealed, the oxygen content of the gas-milk mixture is above 1 ppm but does not exceed about 5 ppm.

The headspace may be filled with gas that is essentially just evolved nitrogen. It will nevertheless improve flavor and stability as compared to a package where there is no headspace. The presence of some evolved oxygen in the headspace will generally improve taste, but with optimum prior processing conditions, its presence is optional. As packaged, the milk-gas mixture generally will have an oxygen content of at least 1-2 ppm. For taste improvement, that level is preferably about 5 ppm but not substantially in excess of about 5 ppm, since it appears that the presence of oxygen in the milk in this concentration range is desirable for reducing the "cooked" flavor of the milk while it is stored on the shelf. It is theorized that oxygen in the milk, or in the controlled volume headspace of the package, reacts with the sulfhydryl compounds in the milk either to eliminate them or to cause them to migrate into the headspace. Experimental evaluations demonstrate that the cooked flavor does appear to be reduced when the aseptic packaged milk is permitted to stand over a period of time.

The volume of the headspace that is formed in the closed container is important. For an 8 ounce package, that is, for a half pint package of milk, a headspace volume of 12 cc to 14 cc is preferred. In round numbers, this is a headspace volume of about 5% to 6% of the total volume in the closed container. In a quart container, holding 32 ounces of milk, a headspace volume of about 52 cc to about 54 cc is preferred. Once again, this is about 5% to about 6% of the total volume of the closed package. Achieving this desired volume involves adjusting the flow rate of the milk, its pressure, and the pressure of the injection gas, in a given system.

Practicing the process of the invention appears to affect the stability of the milk. At this time, it is not clear whether it is the injection of the gas into the milk, or the evolution of small bubbles of gas within the milk during the filling operation, or a combination of the two, that is responsible for the favorable results that occur. However, the interaction of the fine gas bubbles and the milk appears to result in an inhibition of the separation of fat from the milk. There seems to be little difference in the stability of the aseptically packaged milk by reason of the chemical composition of the injected gas. It is theorized that the very small, if not microscoptic, gas bubbles that are evolved during fill maintain the stability of the emulsion.

The invention will now be illustrated in greater detail by a description of several specific examples. In these examples, all parts and percentages are by weight, and all temperatures are in degrees Celsius, unless expressly indicated to be otherwise.

In all of these examples, a nozzle was used for gas injection. It was mounted in a tee that had been inserted in the pipeline for carrying the sterile milk from the UHT treatment to the filling equipment. Within this tee, the nozzle was disposed to discharge gas downwardly into the milk stream. It was supplied with injection gas under pressure. The injection gas was thus brought in at a 90° angle to the direction of flow of the sterile milk stream, and the gas was injected from the nozzle directly into the flowing milk. This arrangement permitted a good degree of turbulence to occur at and downstream of the injection site, assuring good intermingling of the injected gas and the milk. The gas was injected at a gauge pressure of 1.8 bars, which is approximately 30 psi or two atmospheres. Generally, the injection pressure may be in the range 1.5 to 2.5 bars. During filling and after filling, the milk-gas mixture filled into the container, and prior to the closing of the container, was at atmospheric pressure, that is, at approximately one bar, since the mixture was filled into an open container. Exposure of the gas-milk mixture to atmospheric pressure is very brief. The tubular package stock is filled rapidly and the crimping jaws actually crimp the package wall together while tha gas-milk mixture is between the wall parts that are pressed together.

One type of vertical form, fill, and seal machine that is of the general type that could be used is illustrated in patent No. 3,789,888, the disclosure of which is incorporated here by reference. The Tetra-Pak aseptic filling machine is a preferred vertical form, fill and seal machine, but other similar equipment is available and may be used. The invention may also be used for the aseptic filling of preformed open cartons that are carried beneath the fill spout on a conveyor, filled and then sealed. Suitable valve or other control arrangements may be used to effect continuous operation or intermittent operations, in such a case.

While generally the amount of headspace formed in the closed, aseptically filled container in the following experiments was about 5% to 6% of total volume, it could be as low as 2%, or as high as something more than 6%. However, it is generally uneconomical to provide a headspace in excess of about 6% of total volume. For stability and for best flavor improvement, the headspace should be in excess of about 2% of total volume, and preferably, 5% to 6% of total volume.

EXAMPLE 1

Demonstration of the Process of the Invention; Use of Gas Injection and Headspace A shipment of good quality raw milk was heated and standardized to 3.25% butterfat (B.F.) content, using a separator. Vitamin $D_3$ was added.

The milk was subsequently processed on the Stork/Brik equipment, i,e., subjected to indirect UHT treatment, followed by sterile gas injection using the equipment described above, then the gas-milk mixture was filled into tubular laminated container stock that was promptly formed into 250 ml sterile cartons, under aspectic conditions. Five different runs were made under different conditions, as summarized in Table 1 below. The subsequent evaluations of these aseptically packaged products are reported in Table 2 below.

TABLE 1

| Trial No. | Residence time in Hold Tube | Rate* | Temperature of Milk Leaving Hold Tube | Composition of Injection Gas | Headspace Formed in Container |
|---|---|---|---|---|---|
| 1-A | 5.37 sec. | 30% | 286° F. | none | None |
| 1-B | 5.37 sec. | 30% | 286° F. | $N_2$, 97.5%; $O_2$, 2.5% | 14 cc. |
| 1-C | 5.37 sec. | 30% | 286° F. | $N_2$ | 14 cc. |
| 1-D | 5.37 sec. | 30% | 286° F. | $N_2$, 95%; $O_2$, 5% | 14 cc. |
| 1-E | 5.37 sec. | 30% | 292° F. | $N_2$, 95%; $O_2$, 5% | 14 cc. |

*The rate is expressed as a percentage of the maximum possible throughput.

TABLE 2

| Product of Trial No. | Stored at 40° F. | Stored at RT* | Rating of product after days of storage: 69 | 90 | 123 | 153 | 180 |
|---|---|---|---|---|---|---|---|
| 1-A | x | | 8 FS** | — | — | — | — |
| 1-A | | x | 8 FS | — | — | — | — |
| 1-B | x | | 8 | 7 SFS***; FF**** | 6.5 | 6.5 | 6.5 |
| 1-B | | x | 8 | 7 SFS;FF | 6.5 FS | 5.5 FS | 4 |
| 1-C | x | | 8 | 7 SFS;FF | 6.5 | 6.5 | 6.5 |
| 1-C | | x | 8 | 7 SFS;FF | 6.5 FS | 5.5 FS | 4 |
| 1-D | x | | 8 | 7.5 best flavor | 7.0 | 7.0 | 6.0 |
| 1-D | | x | 8 | 7.5 | 7.0 FS | 5.5 FS | 4 |
| 1-E | x | | 8 dark color | 7 | 6.5 SFS | 6 | 6 |
| 1-E | | x | 8 darker | 7 darker | 6.5 FS darker | 4 | — |

*Room Temperature
**FS means fat separation observed
***SFS means slight fat separation
****FF means fair flavor The rating scale of 1 to 9 to Table 2 provides a scale in which: 1 is a terrible product, with bad flavor, and/or dark color, and/or physical changes such as fat separation; 5 is the cutoff point of acceptability; and 9 is the highest rating in quality. Products rated 5-9 are acceptable; products rated below 5 are not acceptable.

All of the aseptically packaged products were observed after 40 days of storage. It was evident that those products packaged with no headspace suffered from some separation of fat. The products made with milk that had been injected with nitrogen, or with oxygen-nitrogen mixtures, exhibited no fat separation. This leads to the theory that the protein may be binding to the fat because of the evolved gas captured in the headspace. Such binding, if it occurred, would assist in keeping the fat in suspension.

EXAMPLE 2

Further Demonstration of the Invention; Low Fat Milk

As in Example 1, good quality raw milk received from the dairy was processed through a Cherry plate heat exchanger and standardized to 2.0% B.F.; actual analysis was 2.16% B.F. Vitamins A and $D_3$ were added. This batch of low fat vitamin-enriched milk is identified as batch 131-1.

Batch 131-1 was processed on the Stork/Brik equipment, that is, subjected to indirect UHT treatment, followed by sterile gas injection as described above, then the gas-milk mixture was filled into 250 ml sterile cartons under aseptic conditions. As in the previous example, five different runs were made. The values for the respective residence times, rates, temperature of the milk leaving the hold tube, composition of the injection gas, and headspace formed in the carton, are identical with the entries for the five respective runs in Table 1 and are therefore not reproduced again. The subsequent evaluations of the aseptically packaged products produced are reported in Table 3 below.

TABLE 2

| Product of Trial No. | Stored at 40° F. | Stored at RT* | Evaluation of Aseptic Packages from Batch 131-1 Rating of product after days of storage: 62 | 89 | 115 | 151 | 178 |
|---|---|---|---|---|---|---|---|
| 131-1A | x | | 8 SFS | 7 SFS | 7 MFS; F-GF** | 6.0 MFS | FS |
| 131-1A | | x | 8 SFS | 7 MFS | 7 MFS; F-GF | 6.0 FS | FS |

TABLE 2-continued

Evaluation of Aseptic Packages from Batch 131-1

| Product of Trial No. | Stored at 40° F. | RT* | Rating of product after days of storage: 62 | 89 | 115 | 151 | 178 |
|---|---|---|---|---|---|---|---|
| 131-1B | x | | 8 | 7 MFS | 7 MFS; F-GF | 6.0 | FS |
| 131-1B | | x | 8 SFS | 7 MFS | 7 MFS; F-GF | 6.0 | FS |
| 131-1C | x | | 8 | 7.5 best flavor | 7 | 6.5 better flavor than 131-1B | FS |
| 131-1C | | x | 8 SFS | 7.5 | 7 MFS; F-GF | 6.5 better flavor than 131-1B | FS |
| 131-1D | x | | 8 | 7 | 7 MFS; F-GF | 6.0 better flavor than 131-1B | FS |
| 131-1D | | x | 8 | 7 | 7 MFS; F-GF | 6.0 better flavor than 131-1B | FS |
| 131-1E | x | | 8 | 7 | 7 MFS; F-GF | 6.0 better flavor than 131-1B | FS |
| 131-1E | | x | 8 SFS | 7 | 7 MFS; F-GF | 6.0 better flavor than 131-1B | FS |

*MFS: Moderate fat separation
**F-GF: Fair to good flavor

In all runs in this example, the homogenization pressures were 2000 psi at the first stage and 600 psi at the second stage. The gas injection pressure employed was 1.8 bars.

The aseptically packaged products were observed after 33 days. All of the packages without headspace exhibited fat separation. The products with either nitrogen or a mixture of nitrogen and oxygen in the headspace had no fat separation. This lends further support to the theory that the protein content of the milk may be binding the fat, due to the nitrogen or mixture of nitrogen and oxygen in the headspace, and thus may help keep the fat in suspension.

With products similar to those produced from batch 131-1, incubation tests were conducted at 95° F. for six days, taking the packages to be incubated directly from the production line as produced. After the incubation period, the pH was on the order of 6.6, and the odor was acceptable. This confirms that the UHT treatment and aseptic packaging did produce sterile products. The results again demonstrated the need for the provision for a headspace in an aseptic package, with a high content of nitrogen.

General

The foregoing examples present data obtained in a few demonstrations of the invention. Subsequent runs using the same or similar process parameters confirmed that the use of a nitrogen-containing headspace in an aseptic package of milk or other fluid dairy product was highly desirable, and that small amounts of oxygen appear to be beneficial for taste improvement.

Compressed air was evaluated as the injection gas, and while an acceptable product was produced, the product was less desirable than the product with a headspace containing essentially pure nitrogen, and in addition less desirable than a product with a headspace containing a mixture of nitrogen with a small volume percent of oxygen.

The packaging process of the invention is equally appliable to skim milk, lowfat milk, flavored skim and lowfat milk, homogenized whole milk, heavy cream, and whipping cream, and has been successfully demonstrated with all of these. It is also applicable to milk shake mixtures and mixtures intended for use in the dessert products, such as frozen dessert products.

The material from which the carton or package is made has some effect on the stability, flavor and odor of the product. Cartons especially designed for aseptic packaging are preferred. Other materials tend to produce less satisfactory results.

While the two examples report data based on the use of indirect process UHT treatment, the injected gas technique of the invention is equally useful where the direct UHT treatment is empolyed. Depending on initial milk quality, acceptable results can be obtained from indirect-process UHT treatment milk. It is preferred to subject the indirect UHT-treated milk to vacuum prior to gas injection, to reduce the oxygen content of the milk prior to gas injection. Preferably the oxygen content should be reduced below 5 ppm. A vacuum of about 15 inches of mercury absolute gives goods results, but the particular degree of vacuum employed does not seem to be important. Ordinarily the vacuum treatment will take pace while the milk is at an elevated temperature such as, for example, 185° F. or so.

The temperature of the milk at the gas injection site is in the range from 35° F. to 100° F., and more preferably, 50° F. to 75° F. The size of the orifice, when an injection nozzle is used, depends upon many other variables, including gas supply pressure, liquid pressur, liquid viscosity, rate of liquid flow, pipeline diameter, and so forth.

While the invention has been disclosed in this patent application be reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for the aseptic packaging of a liquid, fat-containing dairy product with enhanced fat-emulsion stability comprising:

injecting into a flowing, cofined sterile stream of sterile liquid, fat-containing dairy product a sterile gas that is injected into said liquid at a gauge pressure in the range of 1.5 to 2.5 bars to form a confined flowing stream of a mixture of said liquid and of said sterile gas in the form of fine bubbles substantially uniformly distributed throughout said flowing stream of liquid, wherein said gas consists essentially of inert gas and up to about 5% by volume oxygen, directing said stream of said mixture of liquid dairy product and fine bubbles fo gas under aseptic conditions into an open, sterile container to fill it, closing and sealing said filled container about said mixture under aseptic conditions, said mixture upon standing in said sealed container separating into separate layers of said liquid dairy product and said gas, said gas filling a heaspace portion of said container, wherein the amount of said gas injected is sufficient such that said headspace portion occupied by said sterile gas is from 2% to 10% of the total volume of said container and wherein the amount of gas injected into said liquid and the pressure under which said gas is injected are sufficient such that frothing and foaming during filling are minimized and said liquid exhibits no fat separation for an extended storage period, said layer of liquid dairy product having an oxygen content that does not exceed about 5 ppm.

2. The process of claim 1 wherein said liquid dairy product has been subjected to a vacuum treatment prior to said injection of gas, resulting in the reduction of its oxygen content to less than about 5 ppm prior to said gas injection. 2

3. The process of claim 2 whererin said gas contains an amount of oxygen such that the oxygen content of said dairy product, upon sealing of said container, does not exceed about 5 ppm.

4. The method of claim 3 wherein said inert gas is nitrogen.

5. The process of claim 4 wherein said dairy product is milk.

6. The process of claim 2 wherein said inert gas is nitrogen.

7. The process of claim 1 wherein said liquid dairy product has been subjected to an indirect heat exchange treatment to sterilize it prior to said injection of gas and said fluid dairy product has an initial oxygen content in excess of about 5 ppm.

8. The process of claim 1 wherein said inert gas is nitrogen.

9. The process of claim 1 wherein said headspace amounts to from about 2% to about 6% of the total volume of said container.

10. A packaged sterile liquid, fat-containing dairy product produced by the method of claim 59.

* * * * *

UNITED STATES PATENT AND TRADEMARK OFFICE
CERTIFICATE OF CORRECTION

PATENT NO. : 4,935,255
DATED : June 19, 1990
INVENTOR(S) : Delmar L. Andersen et al.

It is certified that error appears in the above-identified patent and that said Letters Patent is hereby corrected as shown below:

Col. 1, line 59, replace "the" with --the water--

Col. 5, line 22, replace "99 ppm" with --9 ppm--

Col. 8, line 62, replace "Table 2" with --Table 3--

Col. 9, line 1, replace "Table 2" with --Table 3--

Claim 1, col. 11, line 22, correct the spelling of "confined"

Col. 11, line 33, correct the spelling of "of"

Col. 11, line 39, correct the spelling of "headspace"

UNITED STATES PATENT AND TRADEMARK OFFICE
CERTIFICATE OF CORRECTION

PATENT NO. : 4,935,255

DATED : June 19, 1990

INVENTOR(S) : Delmar L. Andersen et al

It is certified that error appears in the above-identified patent and that said Letters Patent is hereby corrected as shown below:

Claim 2, col. 12, line 16, delete "2"

Signed and Sealed this

Twenty-second Day of October, 1991

Attest:

HARRY F. MANBECK, JR.

*Attesting Officer*  *Commissioner of Patents and Trademarks*